United States Patent
Song et al.

(10) Patent No.: US 12,466,161 B2
(45) Date of Patent: Nov. 11, 2025

(54) ON-LINE SYNCHRONOUS REGISTERING CO-EXTRUSION SPC FLOOR AND PRODUCTION PROCESS THEREFOR

(71) Applicant: UNILIN, BV, Wielsbeke (BE)

(72) Inventors: Jiangang Song, Zhejiang (CN); Jiajin Fu, Zhejiang (CN); Fuqing Liu, Zhejiang (CN)

(73) Assignee: UNILIN, BV, Wielsbeke (BE)

( * ) Notice: Subject to any disclaimer, the term of this patent is extended or adjusted under 35 U.S.C. 154(b) by 0 days.

(21) Appl. No.: 18/625,410

(22) Filed: Apr. 3, 2024

(65) Prior Publication Data

US 2024/0246318 A1    Jul. 25, 2024

Related U.S. Application Data

(63) Continuation of application No. 17/781,154, filed as application No. PCT/CN2019/108011 on Sep. 26, 2019, now Pat. No. 11,975,526.

(30) Foreign Application Priority Data

Sep. 25, 2019  (CN) .......................... 201910907919.1

(51) Int. Cl.
  *B32B 27/18*   (2006.01)
  *B29D 7/00*   (2006.01)
  (Continued)

(52) U.S. Cl.
  CPC ............ *B32B 9/045* (2013.01); *B29D 7/00* (2013.01); *B32B 3/30* (2013.01); *B32B 9/002* (2013.01);
  (Continued)

(58) Field of Classification Search
  CPC .. B29B 7/002; B29B 7/10; B29B 7/48; B29B 7/726; B29B 7/7461; B29B 7/82;
  (Continued)

(56) References Cited

U.S. PATENT DOCUMENTS 2,831,097 A    4/1958   Malewski
3,024,154 A    3/1962   Singleton et al.
(Continued)

FOREIGN PATENT DOCUMENTS

CN    2210082 Y    10/1995
CN    1420025 A    5/2003
(Continued)

OTHER PUBLICATIONS

Extended European Search Report from Corresponding European Patent Application No. EP19947383.6, Nov. 7, 2023.
(Continued)

*Primary Examiner* — Lawrence D Ferguson
(74) *Attorney, Agent, or Firm* — Workman Nydegger

(57) ABSTRACT

On-line synchronous registering co-extrusion SPC floor includes a base material layer, a decorative layer, and a wear-resistant layer. The decorative layer is arranged on the base material layer and provides patterns and designs. The wear-resistant layer is arranged on the decorative layer, is a transparent layer or a semi-transparent layer, and is provided with a concave-convex surface. The patterns or designs correspond to the concave-convex surface; the base material layer is composed of an elastic layer, a strength layer, and a stable layer, and shading is pressed on the bottom layer of the stable layer. Two co-extrusion lines are used for simultaneous extrusion to achieve an ABA three-layer effect of an SPC base material layer. A calender matches a synchronous registering system, and the patterns of the decorative layer are formed in a rolling manner.

15 Claims, 1 Drawing Sheet

(51) Int. Cl.
  *B32B 3/30* (2006.01)
  *B32B 9/00* (2006.01)
  *B32B 9/04* (2006.01)
  *B32B 27/08* (2006.01)
  *B32B 27/30* (2006.01)
  *E04F 15/10* (2006.01)
  *B29K 27/06* (2006.01)
  *B29K 105/00* (2006.01)

(52) U.S. Cl.
  CPC .............. *B32B 27/08* (2013.01); *B32B 27/18* (2013.01); *B32B 27/304* (2013.01); *E04F 15/105* (2013.01); *E04F 15/107* (2013.01); *B29K 2027/06* (2013.01); *B29K 2105/0044* (2013.01); *B29K 2995/002* (2013.01); *B32B 2307/4026* (2013.01); *B32B 2307/412* (2013.01); *B32B 2307/414* (2013.01); *B32B 2307/554* (2013.01); *B32B 2419/04* (2013.01)

(58) Field of Classification Search
  CPC ... B29C 48/0011; B29C 48/002; B29C 48/21; B29D 7/00; B29K 2027/06; B29K 2105/0044; B29K 2995/002; B32B 2250/05; B32B 2255/10; B32B 2255/26; B32B 2264/102; B32B 2307/4026; B32B 2307/412; B32B 2307/414; B32B 2307/554; B32B 2419/04; B32B 2471/00; B32B 27/08; B32B 27/18; B32B 27/304; B32B 3/30; B32B 9/002; B32B 9/045; E04F 15/105; E04F 15/107
  See application file for complete search history.

(56) References Cited

U.S. PATENT DOCUMENTS

| | | | |
|---|---|---|---|
| 3,196,062 | A | 7/1965 | Kristal |
| 3,471,354 | A | 10/1969 | Scofield |
| 3,741,851 | A | 6/1973 | Erb et al. |
| 3,953,639 | A | 4/1976 | Lewicki, Jr. |
| 3,959,567 | A | 5/1976 | Bradley |
| 4,069,081 | A | 1/1978 | Drower et al. |
| 4,105,491 | A | 8/1978 | Haase et al. |
| 4,312,686 | A | 1/1982 | Smith et al. |
| 4,589,942 | A | 5/1986 | Korinek |
| 4,605,458 | A | 8/1986 | Nakamura |
| 4,612,074 | A | 9/1986 | Smith et al. |
| 4,773,959 | A | 9/1988 | Smith et al. |
| 4,776,912 | A | 10/1988 | Laval |
| 5,087,319 | A | 2/1992 | Held |
| 5,118,532 | A | 6/1992 | Batson et al. |
| 5,122,212 | A | 6/1992 | Ferguson et al. |
| 5,928,762 | A | 7/1999 | Aizawa et al. |
| 6,416,607 | B1 | 7/2002 | Tsai et al. |
| 8,424,487 | B2 | 4/2013 | Cho et al. |
| 8,647,556 | B2 | 2/2014 | Swanson et al. |
| 9,249,580 | B2 | 2/2016 | Meersseman et al. |
| 10,774,543 | B2 | 9/2020 | Segaert et al. |
| 10,953,686 | B2 | 3/2021 | Maesen |
| 10,988,939 | B2 | 4/2021 | Van Vlassenrode et al. |
| 11,041,317 | B2 | 6/2021 | Tong |
| 11,091,919 | B2 | 8/2021 | Van Vlassenrode et al. |
| 11,155,024 | B2 | 10/2021 | Lensing et al. |
| 11,505,949 | B2 | 11/2022 | Meersseman et al. |
| 11,633,904 | B2 | 4/2023 | Wang et al. |
| 11,633,905 | B2 | 4/2023 | Wang et al. |
| 2002/0014047 | A1 | 2/2002 | Thiers |
| 2003/0072919 | A1 | 4/2003 | Watts, Jr. et al. |
| 2004/0076828 | A1 | 4/2004 | Pierson et al. |
| 2005/0029704 | A1 | 2/2005 | Wu et al. |
| 2005/0051931 | A1 | 3/2005 | Humlicek et al. |
| 2005/0077001 | A1 | 4/2005 | Stabile |
| 2005/0124242 | A1 | 6/2005 | Norvell et al. |
| 2005/0173063 | A1 | 8/2005 | Hiramoto |
| 2007/0116929 | A1 | 5/2007 | Fujimori et al. |
| 2008/0122129 | A1 | 5/2008 | Koivukunnas et al. |
| 2008/0210366 | A1 | 9/2008 | Chen |
| 2008/0268203 | A1 | 10/2008 | Blenkhorn |
| 2010/0282162 | A1 | 11/2010 | Cho et al. |
| 2011/0167744 | A1 | 7/2011 | Whispell et al. |
| 2011/0227238 | A1 | 9/2011 | Mimura et al. |
| 2012/0064298 | A1 | 3/2012 | Orr et al. |
| 2013/0071589 | A1 | 3/2013 | Hannington et al. |
| 2013/0228946 | A1 | 9/2013 | Comerio |
| 2016/0076182 | A1 | 3/2016 | Strube et al. |
| 2017/0210109 | A1 | 7/2017 | Naeyaert |
| 2017/0361522 | A1 | 12/2017 | Wang et al. |
| 2018/0117830 | A1 | 5/2018 | Lensing et al. |
| 2020/0318362 | A1 | 10/2020 | Tong |
| 2023/0211543 | A1 | 7/2023 | Wang et al. |
| 2023/0211544 | A1 | 7/2023 | Wang et al. |
| 2023/0356503 | A1 | 11/2023 | Song et al. |

FOREIGN PATENT DOCUMENTS

| | | |
|---|---|---|
| CN | 1616217 A | 5/2005 |
| CN | 101569484 A | 11/2009 |
| CN | 101879498 A | 11/2010 |
| CN | 102101411 A | 6/2011 |
| CN | 105599420 A | 5/2016 |
| CN | 105904823 A | 8/2016 |
| CN | 205767912 U | 12/2016 |
| CN | 205800445 U | 12/2016 |
| CN | 107806221 A | 3/2018 |
| CN | 109895472 A | 6/2019 |
| CN | 110126405 A | 8/2019 |
| DE | 102006019591 B3 | 5/2007 |
| EP | 3257654 A1 | 12/2017 |
| EP | 4039910 A1 | 8/2022 |
| GB | 2343945 A | 5/2000 |
| JP | H06215371 A | 8/1994 |
| JP | H06297570 A | 10/1994 |
| JP | H07276497 A | 10/1995 |
| JP | H0839669 A | 2/1996 |
| JP | H09267570 A | 10/1997 |
| KR | 20190074728 A | 6/2019 |
| WO | 2016050696 A1 | 4/2016 |
| WO | 2016184581 A1 | 11/2016 |
| WO | 2017215046 A1 | 12/2017 |
| WO | 2021056298 A1 | 4/2021 |

OTHER PUBLICATIONS

International Search Report from corresponding PCT Chinese Application No. PCT/CN2019/108011, May 8, 2020.

International Preliminary Report on Patentability from corresponding PCT Chinese Application No. PCT/CN2019/108011, Mar. 15, 2022.

ON-LINE SYNCHRONOUS REGISTERING CO-EXTRUSION SPC FLOOR AND PRODUCTION PROCESS THEREFOR

TECHNICAL FIELD

The present invention relates to the technical field of floorboard production, in particular to an online synchronously coextruded SPC floorboard and a process for producing same.

BACKGROUND ART

Plastic floorboards are light in weight, waterproof, convenient to fit, and can replace natural wood, thus reducing the destruction of natural resources, so have become people's first choice of decorating material. There are many types of plastic floorboards; among these, PVC floorboards with synchronous pattern alignment are effective in many ways such as being environmentally friendly, wear-resistant, impact-resistant, anti-static and soundproofing, as well as having a surface design pattern with a three-dimensional embossed effect, so these floorboards are able to meet people's demands regarding floorboard appearance and performance simultaneously, and are thus very popular among consumers. Most conventional floorboards with synchronous pattern alignment are manufactured using a hot-press laminating process: based on the pattern required, decorative paper and pressed relief steel plate with the same grain are produced, then a hot pressing machine is used to press and bond the relief steel plate and the decorative paper with glue on its surface onto a base material, such that the steel plate and decorative paper coincide perfectly in grain and depth variation. This process involves a complex procedure, expensive equipment, high energy consumption and high costs, and the base board is affected by a number of problems such as glue overflow during lamination, a long press-bonding time, easily splitting into layers, and easily developing warpage; manual plate alignment is time-consuming and laborious, and the pattern alignment result is difficult to guarantee, directly affecting the appearance.

In calendering pattern alignment, a calender is used to convey a printed film, a wear-resistant layer and a base board, pressing the three together at the same time, and the design or grain of the printed film is rolled onto the wear-resistant layer and base board according to the design of protruding regions and depressed regions, thus achieving pattern alignment. Compared with the conventional hot-press laminating process, such a method does not require glue, has a high degree of automation and high efficiency, and produces a good lamination result; however, in the course of production, there will be times when the base material and the printed film are not conveyed synchronously, resulting in an offset between the base material and the printed film when they are pressed together, seriously affecting the appearance of the floorboard. Chinese invention patent application no. 201610814256.5 has disclosed a plastic floorboard with a synchronously aligned pattern, wherein synchronous pattern alignment is achieved using a four-roller calender in cooperation with a synchronous pattern alignment system; the four-roller calender rolls the design of a printed layer onto a wear-resistant layer and a base board, and during this process, the synchronous pattern alignment system detects printed layer colour code and node information as well as finished floorboard deviation value information, thereby judging whether the printed layer and base board are being conveyed synchronously, and if the deviation exceeds a preset range, promptly adjusts the conveying of the printed layer and base board so that they are conveyed synchronously. The invention just described makes calendering pattern alignment synchronous and controllable, and effectively increases the accuracy thereof, but during actual operation, the conveying speed of the base board does not respond quickly enough when adjusted due to the high inertia of the base board, and once adjusted cannot be maintained for a very long time, but needs to be constantly adjusted; moreover, because the printed film is very thin, it easily shifts or develops folds when adjusted during the conveying process, and the fitting result is thus affected.

SUMMARY OF THE INVENTION

Technical Problem

Most conventional floorboards with synchronous pattern alignment are manufactured using a hot-press laminating process, which involves a complex procedure, expensive equipment, high energy consumption and high costs, and the base board is affected by a number of problems such as glue overflow during lamination, a long press-bonding time, easily splitting into layers, and easily developing warpage; manual plate alignment is time-consuming and laborious, and the pattern alignment result is difficult to guarantee, directly affecting the appearance. In the case of an existing calendering synchronous pattern alignment process, during actual operation, the conveying speed of the base board does not respond quickly enough when adjusted due to the high inertia of the base board, and once adjusted cannot be maintained for a very long time, but needs to be constantly adjusted; moreover, because the printed film is very thin, it easily shifts or develops folds when adjusted during the conveying process, and the fitting result is thus affected.

Solution to the Problem

Technical Solution

To solve this problem, the present invention provides an online synchronously pattern-aligned coextruded SPC floorboard and a production process thereof, wherein the production process produces a good lamination result, pattern alignment is stable and unlikely to suffer lag, and pattern alignment is adjusted quickly and accurately; and the SPC floorboard produced by the process of the present invention is characterized by good dimensional stability, being unlikely to split into layers, being unlikely to develop warpage, a distinct 3D pattern, wear resistance and UV resistance, etc.

To achieve the above objective, the present invention employs the following specific technical solution:

An online synchronously pattern-aligned coextruded SPC floorboard, comprising a base material layer, a decorative layer and a wear-resistant layer, the base material layer having a bottom grain; the decorative layer is disposed on the base material layer, and has a pattern or design; the wear-resistant layer is disposed on the decorative layer, and is a transparent or translucent layer having an embossed surface; the pattern or design corresponds to the embossed surface; the base material layer consists of a three-layer structure of an elastic layer, a strength layer and a stability layer, and the bottom grain is pressed into a bottom surface of the stability layer.

Preferably, constituent components of the base material layer comprise PVC resin powder, calcium powder, a stabilizer and a toughener; the stone powder contents of the elastic layer and the stability layer make up 60-70 wt % of materials, and the stone powder content of the strength layer makes up 70-80 wt % of materials.

Preferably, the decorative layer is a PVC coloured film with a pattern or design on a surface thereof, and with a coloured side facing the wear-resistant layer.

Preferably, a surface of the wear-resistant layer also has a UV coating.

Another objective of the present invention is to provide a process for producing the SPC floorboard described above.

A method for producing an online synchronously pattern-aligned coextruded SPC floorboard: after being coextruded, a base material layer enters a region between a bottom grain roller and a conveying roller to undergo thickness-setting pre-pressing, and a base material layer having a bottom grain is thus obtained; a decorative layer and a wear-resistant layer are pre-fitted to the base material layer by means of a glue roller and a minor-surface roller, adjusting the conveying speeds of the bottom grain roller, the conveying roller, the mirror-surface roller, the decorative layer and the wear-resistant layer, and enter a region between an elastic roller and a pattern alignment roller; an embossed pattern on a surface of the pattern alignment roller is applied to the wear-resistant layer in an online synchronous fashion, such that an embossed surface is produced on the wear-resistant layer, and such that the embossed surface corresponds to a pattern or design of the decorative layer.

The method for producing an online synchronously pattern-aligned coextruded SPC floorboard specifically comprises the following steps:

S1: mixing of materials: starting materials for an elastic layer, a strength layer and a stability layer of a base material layer are separately put into a high-speed mixer and mixed at high speed; when the temperature of the materials reaches 110-125° C., the materials are discharged into a low-speed mixer and mixed at low speed; when the temperature of the materials reaches 35-50° C., the materials are discharged into an extruder;

S2: extrusion: after being mixed, the starting materials for the elastic layer and stability layer of the base material layer are plasticized and extruded by an extruder A, entering an upper runner and a lower runner of a die, and the strength layer is plasticized and extruded by an extruder B, entering a middle runner of the die; the plasticized materials pass through the runners and then enter die lips, join with each other, and are then coextruded through a mouth of the die, forming the base material layer as three laminated layers;

S3: calendering pattern alignment: the board exiting the die enters a multi-roller calender, firstly entering a region between a bottom grain roller and a conveying roller, has a bottom grain pressed into a lower surface of the stability layer, and is then conveyed onward; a wear-resistant layer servo film-feeding roller and a decorative layer servo film-feeding roller convey the wear-resistant layer and the decorative layer respectively to a speed-adjusting roller set, producing a temporary composite film, which undergoes online speed adjustment in the speed-adjusting roller set and then, in synchrony with the base material layer, enters a roller set formed by a glue roller and a mirror-surface roller to undergo pre-fitting, then the pre-fitted temporary composite film and base material layer enter a roller set formed by the mirror-surface roller and an elastic roller to undergo fitting; they then enter a roller set formed by the elastic roller and a pattern alignment roller, and an embossed pattern on a surface of the pattern alignment roller is applied to the wear-resistant layer in an online synchronous fashion, such that an embossed surface is produced on the wear-resistant layer, and such that the embossed surface corresponds to a pattern or design of the decorative layer; a first CCD image sensor is provided beside the decorative layer, to detect colour code and node information of the decorative layer, and transmit the detected information to a PLC control system; a second CCD image sensor is provided beside the pattern alignment roller, to detect decorative layer colour code and node information on a finished SPC floorboard, detect finished SPC floorboard pattern alignment transverse/longitudinal deviation value information, and transmit the detected information to the PLC control system; at the same time, a sensor inside the pattern alignment roller transmits detected roller speed information to the PLC control system; and based on the deviation value information obtained by feedback, the PLC control system promptly adjusts the conveying speed and transverse position of the decorative layer to achieve online synchronous pattern alignment;

S4: setting and cutting: having undergone pattern alignment, the sheet is conveyed to a setting apparatus by means of a traction apparatus, and undergoes longitudinal edge-cutting according to a width requirement, at the same time entering a cooling/setting system to cool the sheet to room temperature, and undergoes longitudinal cutting according to a required length.

Preferably, when pattern alignment deviation is greater than 3 mm, the PLC control system automatically issues an alarm; feedback is sent to a tension sensor according to deviation information, and the PLC control system automatically adjusts a coloured film tension value, acquires a roller surface image at an embossing endpoint of the roller set formed by the pattern alignment roller and the elastic roller by means of the second CCD image sensor, uses collected image information to perform analysis and processing, automatically judges whether the design is "misaligned", and judges the speed of the speed-adjusting roller set that needs to undergo corresponding adjustment, a transverse adjustment position of the speed-adjusting roller set and the speed of base material layer release, finally sending a result obtained by calculation to a speed-adjusting roller conveying servo motor, a speed-adjusting roller transverse position adjustment servo motor, and a servo motor of the conveying roller and bottom grain roller to perform command execution.

Preferably, when a decorative layer embossing node is faster than a pattern alignment roller embossing node, the system adjusts the tension sensor to increase the tension of the decorative layer, reduces a servo film-feeding speed, reduces the rotation speed of a speed-adjusting roller set servo motor, and at the same time increases the rotation speed of the pattern alignment roller; when the pattern alignment roller embossing node is faster than the decorative layer embossing node, the control system reduces the rotation speed of the pattern alignment roller, and at the same time reduces the tension of the decorative layer, increases the servo film-feeding speed, and increases the rotation speed of the speed-adjusting roller set servo motor.

Preferably, the extruder is a twin-screw extruder, and the extruder process parameters are a zone 1 temperature of 195-210° C., a zone 2 temperature of 190-205° C., a zone 3 temperature of 185-195° C., a zone 4 temperature of 175-190° C., a zone 5 temperature of 170-185° C., and a confluence core temperature of 160-175° C.; the die is a T-shaped die, and each zone of the die is at a temperature of 185-200° C.

Preferably, the high-speed mixer has a rotation speed of 1000-1200 r/min, and the low-speed mixer has a rotation speed of 500-650 r/min.

The present invention employs two extrusion lines for simultaneous extrusion to achieve an ABA three-layer effect in the SPC base material layer, and then rolls the decorative layer pattern accurately and without error by means of the calender in cooperation with a synchronous pattern alignment system, to obtain a multi-layer composite pattern-aligned floorboard that is dimensionally stable and not likely to split into layers, with a distinct pattern and accurate pattern alignment. In this process, several problems need to be overcome; firstly, the base material layer needs to meet structural stability requirements, so that the finished floorboard is not likely to develop problems such as cracking, warpage, splitting into layers or deformation. In the present invention, firstly, the SPC base material layer is configured as a three-layer structure of the elastic layer, strength layer and stability layer from top to bottom, the constituent components of each layer comprising PVC resin powder, calcium powder, a stabilizer and a toughener. The strength layer has a very high stone powder content, accounting for 70 wt %-80 wt % of materials, so is able to impart good dimensional stability to the base material layer in high- and low-temperature environments, and also has good heat-conducting properties, dissipating heat uniformly. Compared with the strength layer, the elastic layer and stability layer have slightly lower stone powder contents, but slightly higher toughener contents, giving the base material layer a certain degree of elasticity, impact resistance and a sound-absorbing effect, and the stability layer also achieves a balancing effect through tension between itself and the surface wear-resistant layer. Thus, through its structural design and constituent components, the present invention makes it possible for the base material layer to preserve its structural stability in high- and low-temperature environments and when subjected to impacts from external forces. In order to produce such a base material layer, the present invention employs a coextrusion process and strictly controls process parameters. Specifically, one extruder extrudes precursors of the elastic layer and stability layer, while another extruder extrudes a precursor of the strength layer. The precursors are then split into layers and enter three channels of the T-shaped die; the precursors then converge in the T-shaped die, and are extruded from one die mouth, thus achieving the ABA three-layer effect. A twin-screw extruder is used and the temperature of each zone of the extruder is controlled to achieve a good mixing effect, and increase the uniformity of distribution of the materials; the temperature of the T-shaped die is suitably increased relative to the confluence core temperature of the extruder, reducing internal stress and preventing cracking or warpage deformation; the thickness of the base material layer is controlled by the die lip gap, and the thicknesses of the upper, middle and lower layers of the base material layer are controlled by the speed of material output from the extruder, to meet different dimensional requirements, and the thickness of each layer is kept within a suitable range so that the function thereof is exploited fully. The base material layer obtained by coextrusion is then calendered by the calender to tightly join the three layers; compared with a hot-press laminating process, neither splitting into layers nor warpage is likely. More preferably, to increase the strength of the join between the three layers of the base material layer, the present invention provides flow-blocking parts at a convergence port of the T-shaped die so that when fluid is about to enter the convergence port, different layers come into contact and experience a certain degree of turbulence at the boundaries, thus increasing the contact time and fusion force between the boundaries of the upper/lower layers of fluid and the middle layer of fluid, and changing the previous simple melt-join direction, thereby forming an irregular melt-join line; this not only makes the join between layers tighter, but also, when a large pulling or pushing force is experienced in a horizontal direction during calendering or use of the floorboard, the action force can be split into various directions due to the irregularity of the melt-join line where the layers are connected, so that the base material layer is not likely to split into layers or crack, and resistance to forces as well as internal stability are increased.

After the base material layer is extruded, calendering pattern alignment is performed. The present invention uses a five-roller calender in cooperation with a synchronous pattern alignment system to achieve accurate pattern alignment; the calender presses together the base material layer, decorative layer and wear-resistant layer and applies the embossed pattern on the surface of the pattern alignment roller to the wear-resistant layer, so that an embossed surface corresponding to the pattern or design of the decorative layer is produced on the wear-resistant layer, thus achieving pattern alignment. In this process, pattern alignment deviation value information is detected by means of the synchronous pattern alignment system, and prompt adjustments are made to the conveying speed and transverse position of the decorative layer and the conveying speed of the base material layer to achieve online synchronous pattern alignment. The present invention can solve various problems in existing synchronous pattern alignment processes, such as base material layer conveying lag, the decorative layer being likely to shift and develop folds, and slow pattern alignment adjustment. Because a large force acts on the base material layer surface and the base material layer is completely fitted to the roller during calendering, the onward conveyance of the base material layer will be hindered; thus, when deviation arises in pattern alignment and the base material conveying speed needs to be adjusted, it is very difficult to complete the adjustment in a single step, and repeated adjustment is often necessary, which is slow and inefficient. In the present invention, by having the base material layer first enter the region between the bottom grain roller and the conveying roller, the bottom grain is pressed into the lower surface of the stability layer. The function of the bottom grain is not only aesthetic, and is not only to make the product better adapted to the substrate surface during use; more importantly, it is to reduce lag when the base material layer is being conveyed, in order to be able to quickly achieve the required conveying speed in the pattern alignment adjustment process, increasing the response speed as well as the efficiency. With regard to the problem of the decorative layer being likely to shift or develop folds, thus affecting pattern alignment: unlike a conventional process, in which a decorative layer is conveyed on its own directly to a glue roller and a minor-surface roller for pre-fitting to a wear-resistant layer and a base material layer, the present invention first forms the temporary composite film from the decorative layer and wear-resistant layer, and then conveys the temporary composite film to the glue roller and mirror-surface roller for pre-fitting to the base material layer. The temporary composite film increases the thickness of the decorative layer, reduces the likelihood that it will shift or develop folds, and is also subjected to online speed adjustment by the speed-adjusting roller set so that it enters the glue roller and mirror-surface roller in synchrony with the base material layer, thus enhancing the accuracy of pre-fitting. The speed-adjusting roller set can also execute speed adjustment commands of the pattern alignment system promptly during pattern alignment adjustment, so that pattern alignment is accurate.

Beneficial Effects

The present invention uses two coextrusion lines to simultaneously extrude a base material layer with the three-layer structure, obtaining a base material layer with good structural stability through the structural design of the elastic layer, strength layer and stability layer and strict control of coextrusion parameters and calendering by the calender. The five-roller calender in cooperation with the pattern alignment system achieves synchronous pattern alignment with high accuracy, and the pressed bottom grain reduces lag when the base material layer is being conveyed, increasing the response speed of pattern alignment adjustment; and the accuracy of pattern alignment and pre-fitting is enhanced by forming the temporary composite film from the decorative layer and wear-resistant layer and then pre-fitting the temporary composite film to the base material layer, and providing the speed-adjusting roller set for online speed adjustment of the temporary composite film. The SPC floorboard of the present invention has good dimensional stability, is not likely to split in layers or warp, has a distinct 3D pattern, is wear-resistant and UV resistant, is soundproofing and damp-proof, and is both practical and aesthetically pleasing.

In the figures: 1—elastic layer, 2—strength layer, 3—stability layer, 4—decorative layer, 5—wear-resistant layer, 6—UV coating, 7—melt-join line, 8—T-shaped die, 9—flow-blocking part.

EMBODIMENTS OF THE INVENTION

The present invention is explained further below with reference to particular embodiments.

Embodiment 1

Figure 1:
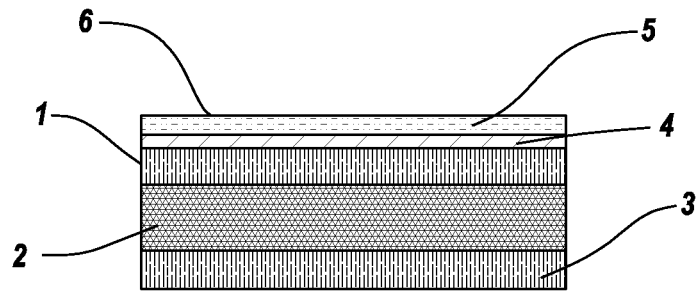
FIG. 1: structural schematic drawing of the SPC floorboard of embodiment 1.

An online synchronously pattern-aligned coextruded SPC floorboard, as shown in FIG. 1, comprises a base material layer, a decorative layer 4 and a wear-resistant layer 5. The base material layer consists of a three-layer structure of an elastic layer 1, a strength layer 2 and a stability layer 3, wherein a bottom grain is pressed into a bottom surface of the stability layer 3. The decorative layer 4 is disposed on the base material layer, being a PVC coloured film with a pattern or design on a surface thereof, and with a coloured side facing the wear-resistant layer 5. The wear-resistant layer 5 is disposed on the decorative layer 4, and is a transparent or translucent layer having an embossed surface, wherein the embossed surface corresponds to the pattern or design of the decorative layer 4; and a surface of the wear-resistant layer 5 also has a UV coating 6. Constituent components of the base material layer comprise PVC resin powder, calcium powder, a stabilizer and a toughener; the stone powder contents of the elastic layer 1 and the stability layer 3 make up 65 wt % of materials, and the stone powder content of the strength layer 2 makes up 75 wt % of materials.

A method for producing the online synchronously pattern-aligned coextruded SPC floorboard described above is as follows: after being coextruded, the base material layer is fed into a region between a bottom grain roller and a conveying roller to undergo thickness-setting pre-pressing, and the base material layer having the bottom grain is thus obtained; the decorative layer 4 and the wear-resistant layer 5 are pre-fitted to the base material layer by means of a glue roller and a mirror-surface roller, adjusting the conveying speeds of the bottom grain roller, the conveying roller, the mirror-surface roller, the decorative layer 4 and the wear-resistant layer 5, and enter a region between an elastic roller and a pattern alignment roller; an embossed pattern on a surface of the pattern alignment roller is applied to the wear-resistant layer in an online synchronous fashion, such that an embossed surface is produced on the wear-resistant layer 5, and such that the embossed surface corresponds to the pattern or design of the decorative layer 4.

A method for producing an online synchronously pattern-aligned coextruded SPC floorboard specifically comprises the following steps:

S1: mixing of materials: starting materials for the elastic layer, strength layer and stability layer of the base material layer are separately put into a high-speed mixer and mixed at high speed (1200 r/min); when the temperature of the materials reaches 120° C., the materials are discharged into a low-speed mixer and mixed at low speed (600 r/min); when the temperature of the materials reaches 45° C., the materials are discharged into an extruder.

S2: extrusion: after being mixed, the starting materials for the elastic layer and stability layer of the base material layer are plasticized and extruded by an extruder A, entering an upper runner and a lower runner of a die, and the strength layer is plasticized and extruded by an extruder B, entering a middle runner of the die; the plasticized materials pass through the runners and then enter die lips, join with each other, and are then coextruded through a mouth of the die, forming the base material layer as three laminated layers; the extruder is a twin-screw extruder, and the extruder process parameters are a zone 1 temperature of 210° C., a zone 2 temperature of 205° C., a zone 3 temperature of 195° C., a zone 4 temperature of 190° C., a zone 5 temperature of 185° C., and a confluence core temperature of 175° C.; the die is a T-shaped die, and each zone of the die is at a temperature of 185° C.; the thickness of the base material layer is controlled by the die lip gap, and the thicknesses of the upper, middle and lower layers of the base material layer are controlled by the speed of material output from the extruder;

S3: calendering pattern alignment: the board exiting the die enters a multi-roller calender, firstly entering the region between the bottom grain roller and the conveying roller, has the bottom grain pressed into the lower surface of the stability layer, and is then conveyed onward; a wear-resistant layer servo film-feeding roller and a decorative layer servo film-feeding roller convey the wear-resistant layer and the decorative layer respectively to a speed-adjusting roller set, producing a temporary composite film, which undergoes online speed adjustment in the speed-adjusting roller set and then, in synchrony with the base material layer, enters a roller set formed by the glue roller and the mirror-surface roller to undergo pre-fitting, then the pre-fitted temporary composite film and base material layer enter a roller set formed by the mirror-surface roller and the elastic roller to undergo fitting; they then enter a roller set formed by the elastic roller and the pattern alignment roller, and the embossed pattern on the surface of the pattern alignment roller is applied to the wear-resistant layer in an online synchronous fashion, such that an embossed surface is produced on the wear-resistant layer, and such that the embossed surface corresponds to the pattern or design of the decorative layer; a first CCD image sensor is provided beside the decorative layer, to detect colour code and node information of the decorative layer, and transmit the detected information to a PLC control system; a second CCD image sensor is provided beside the pattern alignment roller, to detect decorative layer colour code and node information on the finished SPC floorboard, detect finished SPC floorboard pattern alignment transverse/longitudinal deviation value information, and transmit the detected information to the PLC control system; at the same time, a sensor inside the pattern alignment roller transmits detected roller speed information to the PLC control system; and based on the deviation value information obtained by feedback, the PLC control system promptly adjusts the conveying speed and transverse position of the decorative layer to achieve online synchronous pattern alignment;

S4: setting and cutting: having undergone pattern alignment, the sheet is conveyed to a setting apparatus by means of a traction apparatus, and undergoes longitudinal edge-cutting according to a width requirement, at the same time entering a cooling/setting system to cool the sheet to room temperature, and undergoes longitudinal cutting according to a required length.

The adjustment process of the online synchronous pattern alignment is specifically as follows:

When the pattern alignment deviation is greater than 3 mm, the PLC control system automatically issues an alarm; feedback is sent to a tension sensor according to deviation information, and the PLC control system automatically adjusts a coloured film tension value, acquires a roller surface image at an embossing endpoint of the roller set formed by the pattern alignment roller and the elastic roller by means of the second CCD image sensor, uses collected image information to perform analysis and processing, automatically judges whether the design is "misaligned", and judges the speed of the speed-adjusting roller set that needs to undergo corresponding adjustment, a transverse adjustment position of the speed-adjusting roller set and the speed of base material layer release, finally sending a result obtained by calculation to a speed-adjusting roller conveying servo motor, a speed-adjusting roller transverse position adjustment servo motor, and a servo motor of the conveying roller and bottom grain roller to perform command execution.

When a decorative layer embossing node is faster than a pattern alignment roller embossing node, the system adjusts the tension sensor to increase the tension of the decorative layer, reduces a servo film-feeding speed, reduces the rotation speed of a speed-adjusting roller set servo motor, and at the same time increases the rotation speed of the pattern alignment roller; when the pattern alignment roller embossing node is faster than the decorative layer embossing node, the control system reduces the rotation speed of the pattern alignment roller, and at the same time reduces the tension of the decorative layer, increases the servo film-feeding speed, and increases the rotation speed of the speed-adjusting roller set servo motor.

Embodiment 2

Figure 2:
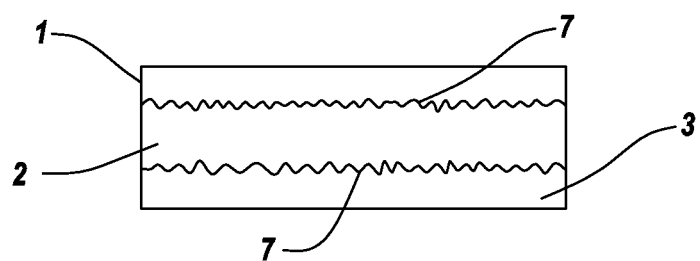
FIG. 2: structural schematic drawing of the base material layer of embodiment 2.
Figure 3:
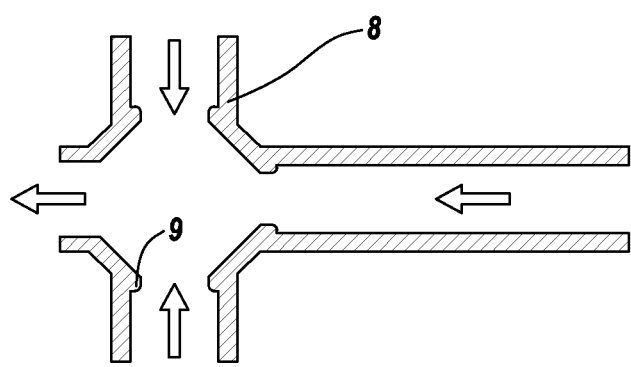
FIG. 3: schematic drawing of the T-shaped die of embodiment 2.

FIG. 2 shows a base material layer of the present invention, consisting of a three-layer structure of an elastic layer 1, a strength layer 2 and a stability layer 3. Melt-join lines 7 between the elastic layer 1 and the strength layer 2 and between the strength layer 2 and the stability layer 3 are irregular in shape, such that the join between layers is tight, and the layers are not likely to separate. The formation of such irregular melt-join lines 7 is achieved by providing flow-blocking parts at a convergence port of the T-shaped die; as shown in FIG. 3, there are streams of three layers in the T-shaped die 8, namely the elastic layer 1, the strength layer 2 and the stability layer 3, which converge toward the die mouth from three directions, and flow-blocking parts 9 are provided where stream outlets intersect. The flow-blocking part 9 causes the flow direction of stream edge fluid to change, and can cause this fluid and edge fluid of an adjacent stream to come into contact fully in multiple directions, before convergence and extrusion; the irregular melt-join lines 7 are produced in this process, and stabilize when the die outputs the board.

These particular embodiments merely explain the present invention, without limiting it. Any changes made by those skilled in the art after reading the specification of the present invention shall be protected by the Patent Law as long as they are within the scope of claims.

The invention claimed is:

1. A floorboard, comprising a base material layer, a decorative layer and a wear-resistant layer, wherein the base material layer has a bottom grain;
   wherein the decorative layer is disposed on the base material layer, and has a pattern or design;
   wherein the wear-resistant layer is disposed on the decorative layer, and is a transparent or translucent layer;
   wherein said base material layer comprises PVC resin and stone powder, wherein a content of said stone powder in said base material layer is more than 60 wt %;
   wherein said transparent or translucent layer has an embossed surface;
   wherein the decorative layer is a PVC coloured film comprising said pattern or design on a surface thereof, wherein said surface faces said wear-resistant layer;
   wherein the wear-resistant layer comprises a UV coating.

2. The floorboard of claim 1, wherein said pattern or design corresponds to the embossed surface.

3. The floorboard of claim 1, wherein the base material layer consists of a three-layer structure of an elastic layer, a strength layer and a stability layer, and the bottom grain is pressed into a bottom surface of the stability layer.

4. The floorboard of claim 3, wherein said strength layer joins said elastic layer and/or said stability layer at an irregular melt-join line.

5. The floorboard of claim 1, wherein said base material layer further comprises a stabilizer and a toughener.

6. The floorboard of claim 5, wherein said stone powder comprises calcium powder.

7. A method for producing a floorboard, said floorboard comprising a base material layer, a decorative layer and a wear-resistant layer, wherein the base material layer has a bottom grain; the decorative layer is disposed on the base material layer, and has a pattern or design; the wear-resistant layer is disposed on the decorative layer, and is a transparent or translucent layer;

wherein said base material layer comprises PVC resin and stone powder, wherein a content of said stone powder in said base material layer is more than 60 wt %, wherein said base material layer is extruded and subsequently said base material layer enters a region between a bottom grain roller and a conveying roller to undergo thickness-setting, and a base material layer having a bottom grain is thus obtained;

wherein said transparent or translucent layer has an embossed surface;

wherein the decorative layer is a PVC coloured film comprising said pattern or design on a surface thereof, wherein said surface faces said wear-resistant layer;

wherein the wear-resistant layer comprises a UV coating.

8. The method of claim 7, wherein said decorative layer and said wear-resistant layer are pre-fitted to the base material layer by means of a glue roller and a mirror-surface roller, adjusting the conveying speeds of the bottom grain roller, the conveying roller, the mirror-surface roller, the decorative layer and the wear-resistant layer, and enter a region between an elastic roller and a pattern alignment roller;

an embossed pattern on a surface of the pattern alignment roller is applied to the wear-resistant layer in an online synchronous fashion, such that an embossed surface is produced on the wear-resistant layer, and such that the embossed surface corresponds to a pattern or design of the decorative layer.

9. A floorboard, comprising a base material layer, a decorative layer and a wear-resistant layer, wherein the base material layer has a bottom grain;

wherein the decorative layer is disposed on the base material layer, and has a pattern or design;

wherein the wear-resistant layer is disposed on the decorative layer, and is a transparent or translucent layer;

wherein said base material layer comprises PVC resin and stone powder, wherein a content of said stone powder in said base material layer is more than 60 wt %;

wherein said transparent or translucent layer has an embossed surface;

wherein said stone powder comprises calcium powder.

10. The floorboard of claim 9, wherein the decorative layer is a PVC coloured film comprising said pattern or design on a surface thereof, wherein said surface faces said wear-resistant layer and wherein said transparent or translucent layer comprises a UV coating.

11. The floorboard of claim 10, wherein said pattern or design corresponds to the embossed surface or wherein said embossed surface deviates from said pattern or design with a deviation smaller than 3 millimeter.

12. The floorboard of claim 11, wherein the base material layer consists of a three-layer structure of an elastic layer, a strength layer and a stability layer, and the bottom grain is pressed into a bottom surface of the stability layer.

13. The floorboard of claim 12, wherein said strength layer joins said elastic layer and/or said stability layer at an irregular melt-join line.

14. A floorboard, comprising a base material layer, a decorative layer and a wear-resistant layer, wherein the base material layer has a bottom grain;

wherein the decorative layer is disposed on the base material layer, and has a pattern or design;

wherein the wear-resistant layer is disposed on the decorative layer, and is a transparent or translucent layer, wherein said transparent or translucent layer has an embossed surface;

wherein any deviation between said embossed surface and said pattern is smaller than 3 millimeter;

wherein said base material layer comprises PVC resin and stone powder, wherein a content of said stone powder in said base material layer is more than 60 wt;

wherein said stone powder comprises calcium powder.

15. The floorboard of claim 14, wherein the decorative layer is a PVC coloured film comprising said pattern or design on a surface thereof, wherein said surface faces said wear-resistant layer and wherein said transparent or translucent layer comprises a UV coating.

\* \* \* \* \*